United States Patent
Bares

(10) Patent No.: US 7,611,155 B2
(45) Date of Patent: Nov. 3, 2009

(54) RIDE ON PLATFORM FOR SMALL LOADER

(75) Inventor: Mark F. Bares, Oakes, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 11/743,878

(22) Filed: May 3, 2007

(65) Prior Publication Data

US 2007/0200307 A1    Aug. 30, 2007

Related U.S. Application Data

(63) Continuation of application No. 10/753,739, filed on Jan. 7, 2004, now abandoned.

(60) Provisional application No. 60/438,640, filed on Jan. 8, 2003.

(51) Int. Cl.
*B62D 63/00* (2006.01)
(52) U.S. Cl. .................... 280/32.7; 280/656
(58) Field of Classification Search ............ 280/32.7, 280/656, 63, 79.11, 47.11
See application file for complete search history.

(56) References Cited

U.S. PATENT DOCUMENTS

| | | | |
|---|---|---|---|
| 3,485,314 A | 12/1969 | Herr | |
| 5,004,251 A | 4/1991 | Velke et al. | |
| 5,575,140 A | 11/1996 | Bermes et al. | |
| 5,810,371 A | 9/1998 | Velke | |
| 5,813,679 A * | 9/1998 | Hobrath | 280/32.7 |
| 5,882,020 A | 3/1999 | Velke | |
| 5,909,887 A | 6/1999 | Hobrath | |
| 6,000,705 A | 12/1999 | Velke | |
| 6,062,582 A | 5/2000 | Martin | |
| 6,145,855 A | 11/2000 | Bellis, Jr. | |
| 6,234,495 B1 | 5/2001 | Velke | |
| 6,443,252 B1 * | 9/2002 | Andes | 180/65.1 |
| 6,460,640 B1 | 10/2002 | Keagle et al. | |
| 6,485,036 B1 | 11/2002 | Bricko | |
| 6,488,291 B1 | 12/2002 | Bellis, Jr. | |
| 6,497,422 B1 | 12/2002 | Bellis, Jr. | |
| 6,637,760 B1 | 10/2003 | Carman | |
| 6,692,010 B1 | 2/2004 | Johnson et al. | |
| 6,832,659 B1 | 12/2004 | Bares et al. | |
| 2002/0094263 A1 | 7/2002 | Page | |
| 2002/0171212 A1 | 11/2002 | Bricko | |
| 2008/0197588 A1 * | 8/2008 | Azure et al. | 280/32.7 |

* cited by examiner

*Primary Examiner*—Jeffrey J Restifo
(74) *Attorney, Agent, or Firm*—Westman, Champlin & Kelly, P.A.

(57) ABSTRACT

A ride-on operator platform or sulky is used in connection with a small self-propelled loader to provide a support for an operator. The operator platform is pivotally mounted to the loader about a generally horizontal axis, and has a rear support engaging the surface over which the loader is operating to maintain the operator platform at a desired position relative to the surface. The upward pivoting of rear portions of the operator platform is limited by stop members, and substantial downward pivoting is permitted.

30 Claims, 9 Drawing Sheets

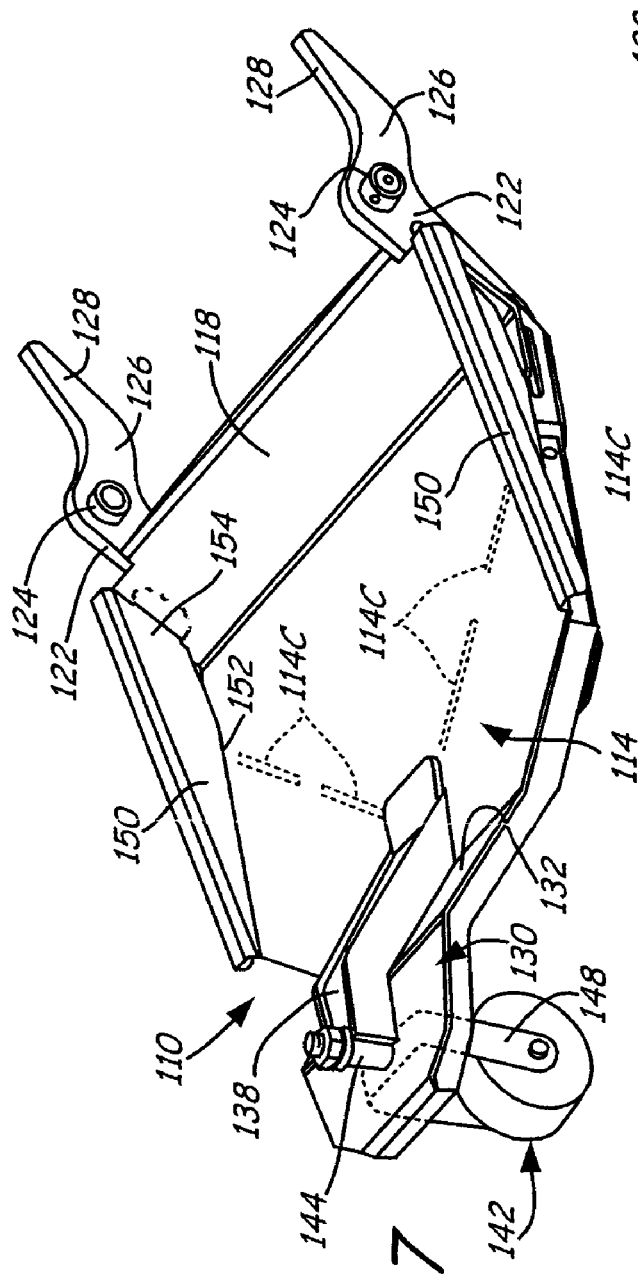
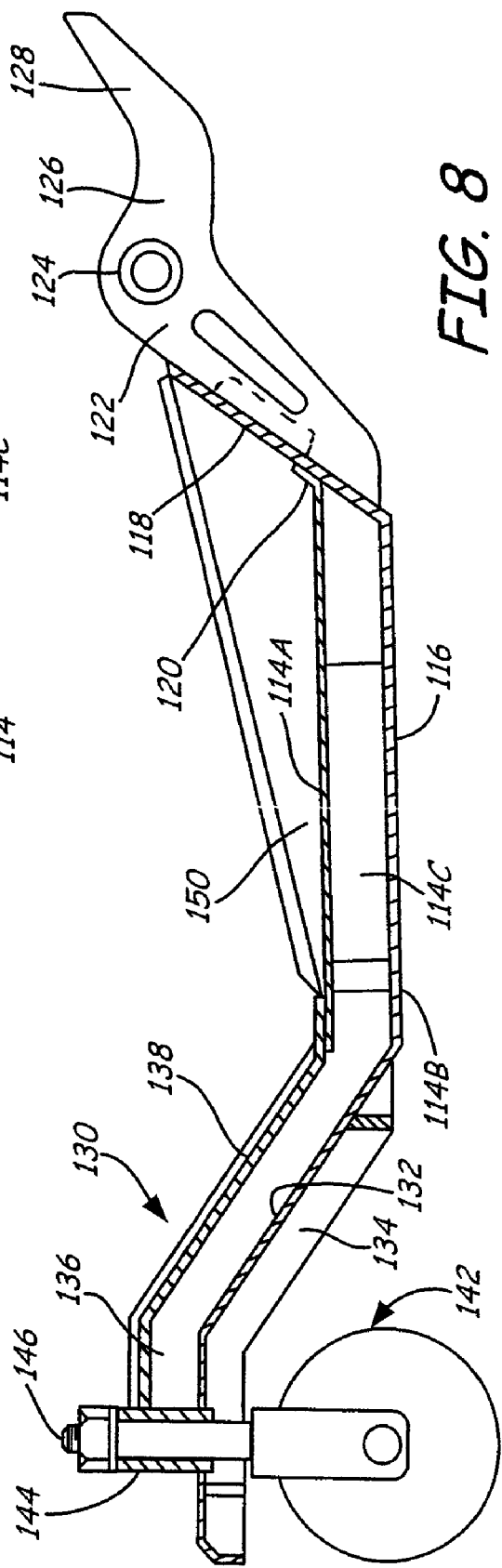

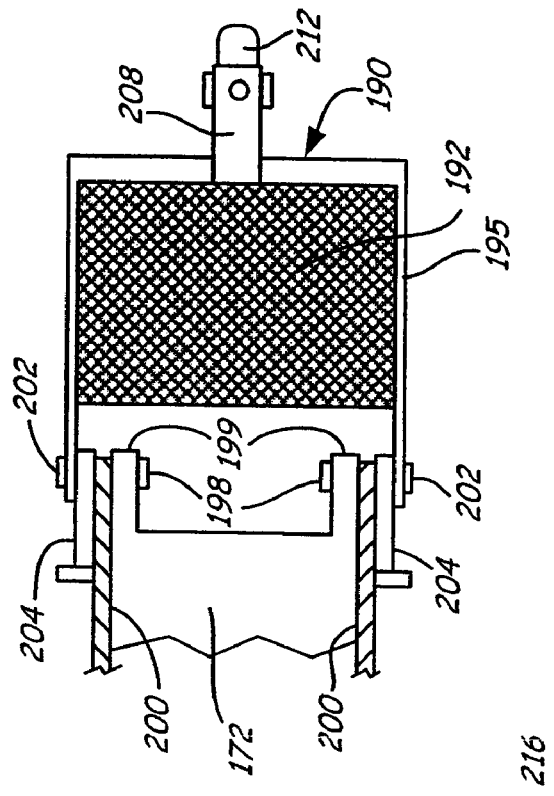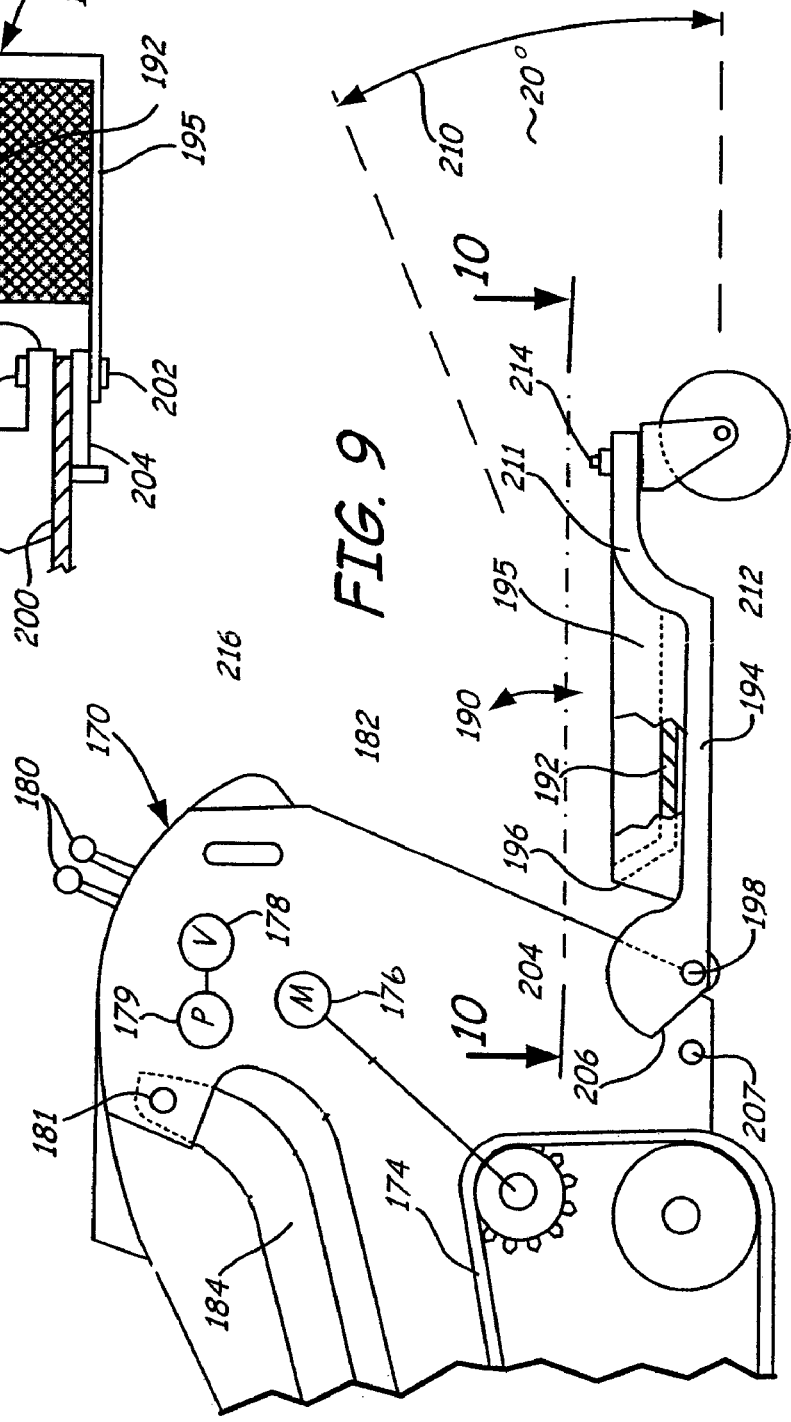

RIDE ON PLATFORM FOR SMALL LOADER

RELATED APPLICATION

This application is a continuation of U.S. patent application Ser. No. 10/753,739, filed Jan. 7, 2004 which claims priority from U.S. Provisional Application Ser. No. 60/438,640, filed Jan. 8, 2003, the content of both of which is incorporated by reference.

BACKGROUND OF THE INVENTION

The present invention relates to a ride on operator platform cart that attaches to a self-propelled machine, such as a small "mini" loader that normally is a walk behind loader. The platform converts the loader to a ride on loader, and common base machine components serve to provide both for ride on and walk behind customer preferences.

Various types of small self-propelled vehicles have utilized operator carts such as on lawnmowers, and even on wheelchairs that are powered. Such carts can provide operator seats or a platform for standing. In some instances carts are provided with wheels and in other instances skids are provided that will slide along the ground as the cart is pulled by the self-propelled vehicle.

Small walk behind self-propelled skid steer loaders have been advanced where the operator walks or stands at the rear of the loader, and operator controls are accessible for raising and lowering buckets, and for controlling forward and reverse motion, as well as steering.

The operation of such skid steer loaders is shown in the prior art. For example, U.S. Pat. No. 6,460,640 shows a typical skid steer mini-loader.

SUMMARY OF THE INVENTION

The present invention relates to the provision of an attachable and detachable ride on platform cart or sulky forming an operator's support for a self-propelled vehicle such as a mini-loader. The platform cart has a frame that attaches about a generally horizontal pivot at the rear of the vehicle frame and has a ground support at the rear. The pivots are two spaced points on opposite sides of the vehicle frame when turning the vehicle, the rear of the operator platform will swing laterally. The ground support can be a caster wheel, a tapered roller, a skid or other types of wheels as desired. Ground pressure and ground disturbance is minimized by the trailing wheels of the platform. The wheels or ground support for the pivoting operator platform cart are behind the operator, so only a fraction of the operator's weight will be supported by the wheel or other support attached to the operator platform cart frame. The rest of the operator's weight is supported on the vehicle.

The operator's ride is stabilized, because of the positioning of the operator between the mounting pivot on the loader frame and the ground support at the rear of the platform, and has the advantage of a much smoother ride then a rigidly attached rider platform at the rear of the loader or vehicle frame. The smoother ride results from the operator position being in the center of the platform where the vertical displacement is roughly one-half of that at the attachment point to the machine or at the rear ground contact point.

The design of the operator platform cart with a hinge or pivot at the front edge where the cart is attached to a vehicle frame, and support wheels at the rear, insures that the operator support panel of the platform cart is maintained so that there is clearance at ridges or points that move closer during hinging. The platform side and front wall design encourages the operator to keep the feet on the platform.

The ground support or structure at the rear of the operator will be the first point of contact with an obstruction if the vehicle engages an object when it is moving in reverse. The rear of the platform is supported such that clearance is maintained between the cart and the ground surface along the rear portions of the platform. The pivots and stops also minimize the motion of the operator should the machine tilt forward.

The pivot connection is a spring lock pin that is quickly installed or removed for rapid conversion from a riding operator or a walk behind operator. The platform can be used on a variety of self-propelled machines or vehicles, such as mowers, utility carts and the like.

BRIEF DESCRIPTION OF THE DRAWINGS

FIG. 7 is a rear perspective view of the operator cart of FIGS. 6 and 7;

FIG. 8 is a sectional view taken on line 8--8 in FIG. 6;

FIG. 9 is a schematic fragmentary view of a rear portion of a loader showing a modified operator platform cart in position at the rear of the loader;

FIG. 10 is a schematic/sectional top view taken on line 10--10 in FIG. 6;

DETAILED DESCRIPTION OF THE PREFERRED EMBODIMENTS

Referring to FIGS. 1-6, and a first form of the invention, a self-propelled small skid steer loader 10 is shown schematically and fragmentarily. This type of loader is shown in U.S. patent application Ser. No. 10/284,432, filed Oct. 30, 2002, for a Loader Frame and Bolt-On Drive Track, and the disclosure of which application is incorporated by reference.

The loader has a frame 12 that supports upright side plates 14 and 16, on opposite sides of the loader. The plates 14 and 16 are joined with cross plates as needed, and can include a lower cross plate that can form an operator's stand.

Figure 1:
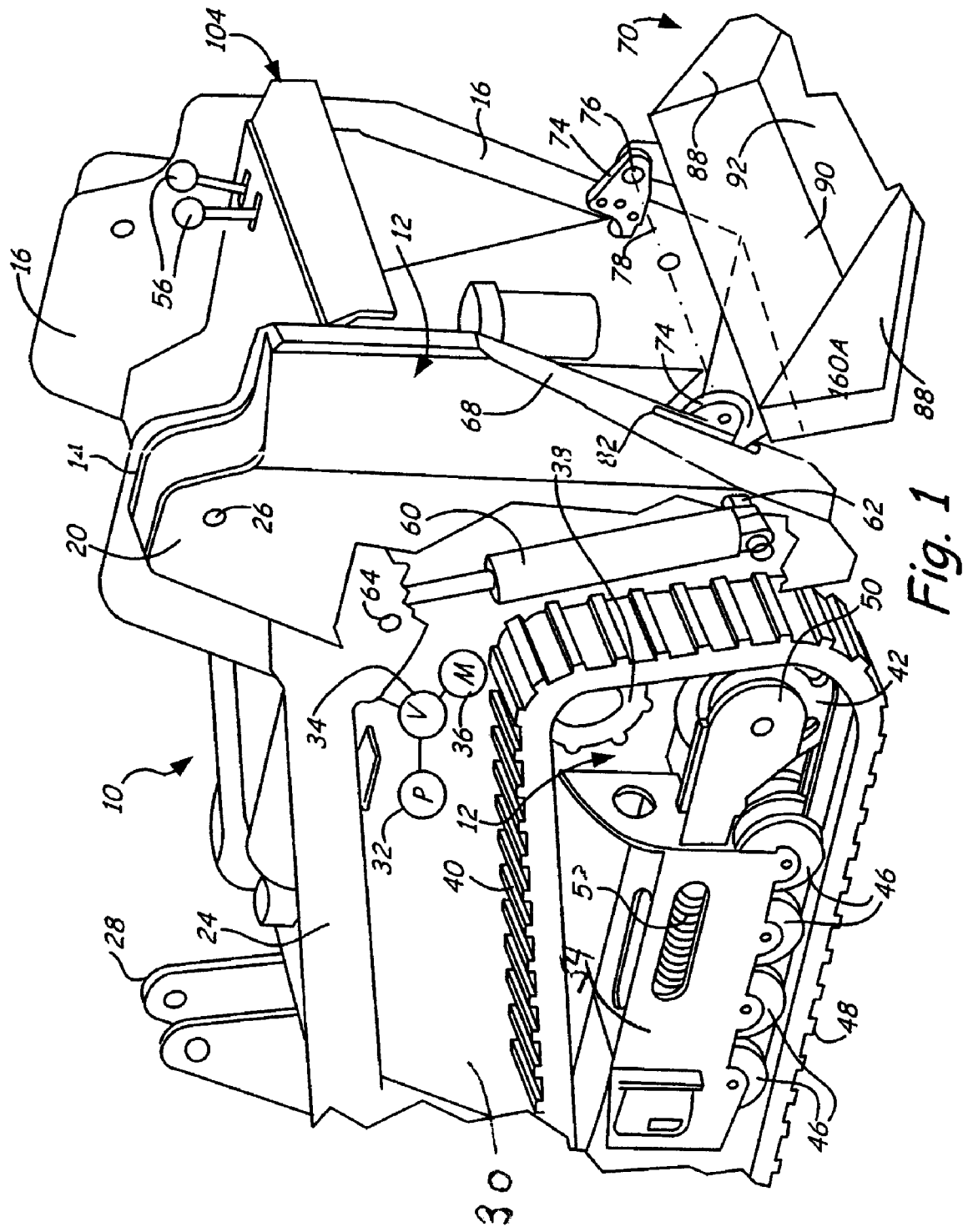
FIG. 1 is a fragmentary rear perspective view of a typical mini-loader, and showing a leading end portion of an operator platform cart attached thereto.

The rear portions of the loader 10 have spaced outer side plates, one of which is shown at 20 in FIG. 1, and the space between these side plates 14, 16, and 20, are used for mounting a lift arm assembly 24, of usual design, that is pivotally mounted as at 26 to the frame and positioned between the plates 20 on the outside, and the respective plates 14 and 16 on the inside. The lift arm assembly 24 has individual lift arms, as shown, and fragmentarily shown is a mast 28 that is used for mounting a bucket control cylinder for a bucket (not shown) or other item or accessory that is mounted at the front end of the lift arms.

The loader has an internal combustion engine mounted in a housing or compartment 30, that is used for driving a pump 32 which is used for providing hydraulic fluid under pressure through valves that are represented just generally at 34, to provide power for driving motors 36 that in turn are used for propelling the loader by individually driving drive sprockets 38 on each side of the machine, individually, to in turn drive tracks 40 that are mounted on each side of the loader. The tracks mount over a front idler roller (not shown), and a rear idler roller 42. The track is driven in both directions as controlled by the operator. The drive track 40 is supported on the ground with bogie wheels 46 that hold the lower reach or length 48 of the track in position.

The tension in the track is maintained with a slide 50 that is loaded with a spring 52 in a housing 54 attached to the frame on each side of the loader.

The loader is steered and is controlled for fore and aft movement using suitable control levers 56 that operate known controls such as valves that are shown generally at 34 for individually controlling the motors 38 for rotation. Variable displacement pumps, control clutches, or electric motors also can be controlled.

In this form of the invention, the lift arms 24 are raised and lowered through the use of hydraulic cylinders 60 on each side of the machine. The hydraulic cylinders have base ends mounted on trunions, including an inner trunion 62 (FIGS. 3 and 4) with a suitable pin, and have rod ends that are mounted as at 64 to side plates of the lift arms. The extending and retracting of cylinders 60 through the use of suitable valves shown schematically at 34 will raise and lower the arms about the pivot 26.

Also, the left side plate 20 and 14, as well as the side plate 16 and the right side plate 20 are joined with a rear cross plate 68, that is used to reinforce the frame.

In this form of the invention, the loader includes an operator platform, also called a platform cart or sulky indicated generally at 70, that has laterally side arm frame members 72 include front end portions which are pivotally mounted onto brackets 74, that are fastened to the side plates 14 and 16, and have journals for receiving quickly removable and replaceable pins 76 that form pivot connections for pivotally mounting the operator platform 70 about a generally horizontal pivot axis shown at 78 in FIG. 1. The pivot pins 76 are quickly removable if the operator platform is not wanted for some operation. The pins 76 are held in hubs 77 on the outer side of brackets 74 with a spring bail pin 75, which is conventional and quickly removed so the pins 76 can be taken out and replaced. The operator platform is supported at laterally spaced locations so it is laterally stable.

Figure 2:
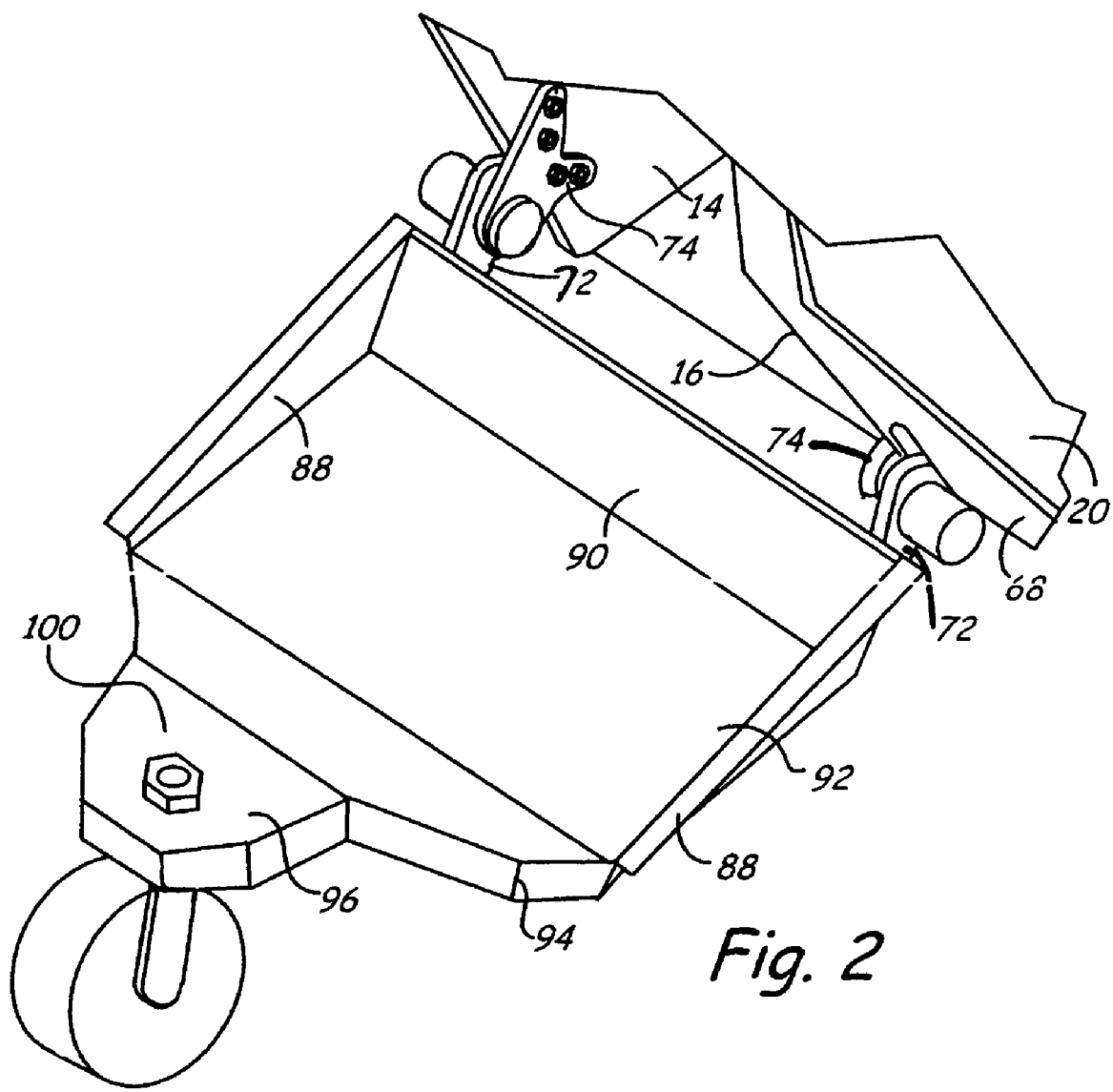
FIG. 2 is a rear perspective view of an operator platform cart made according to the present invention mounted on the rear portions of a mini-loader.
Figure 3:
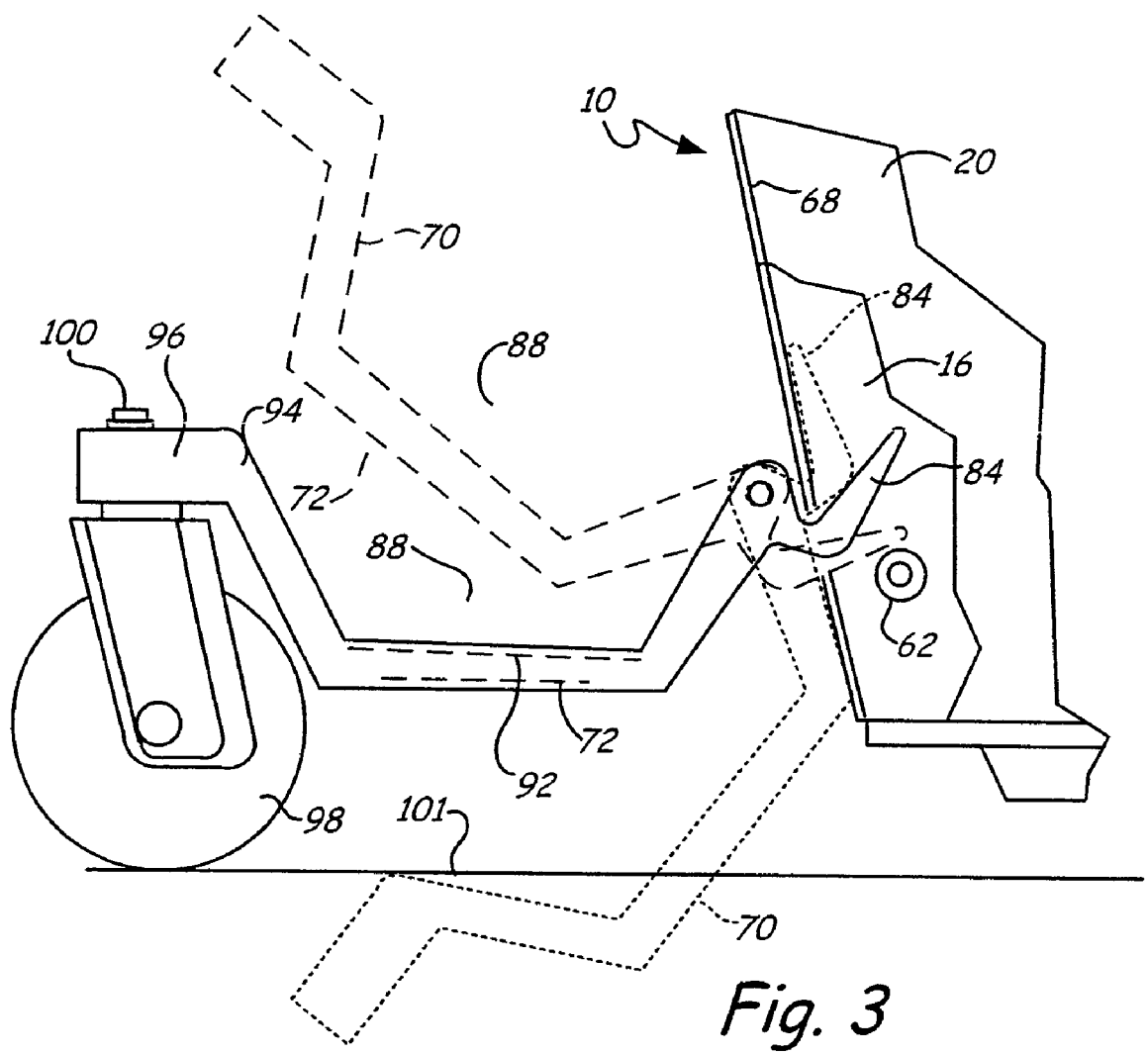
FIG. 3 is a side view thereof schematically illustrating the positioning of the operator platform cart in working position and upward and downward stopped positions.
Figure 4:
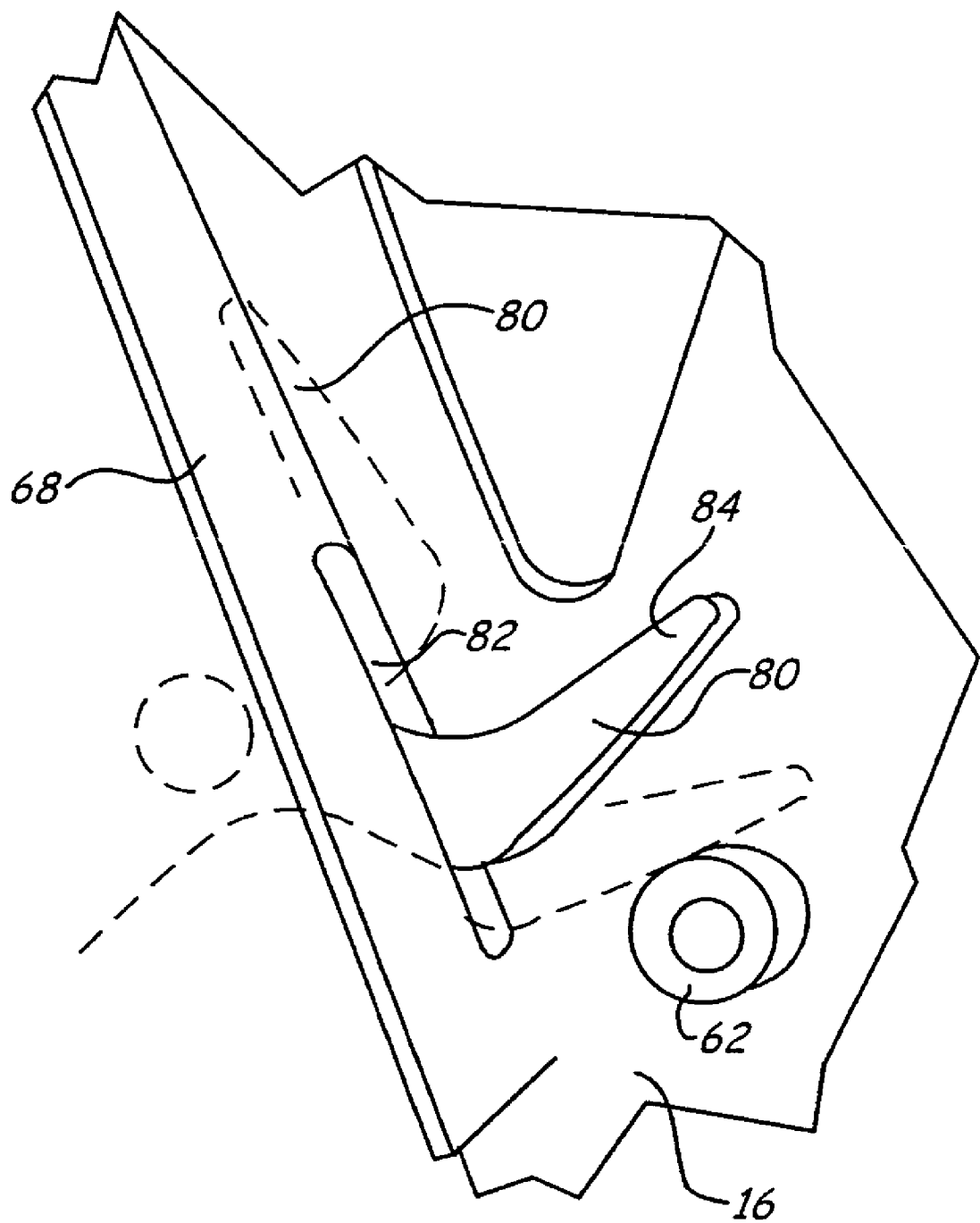
FIG. 4 is a front perspective view of a stop member used with the operator platform cart.

The side frame members 72, as seen in FIGS. 1 and also in FIGS. 2, 4 have stop arms 80 that project forwardly from the pivot pin connection 76 and extend through slots 82 in the side plates 68, and which have end portions 84 that align with the inner trunion 62 on the plates 14 and 16. The stop arms limit pivotal movement of the operator platform in upward and downward directions. The upward direction reduces the angle between the rear of the loader and the operator platform, so that the amount of upward movement pivoting relative to the loader of the rear portions of the operator platform is controlled. Also, while greater downward pivoting is allowed, the stop arms 80 will restrict downward pivoting by engaging the panels 68 as shown in dotted lines in FIGS. 3 and 4 or by the platform bottoming out on the frame. The stop also prevents the operator's platform from pivoting against the machine.

The configuration of the operator platform 70 is shown in FIG. 2 in greater detail. The side frame members 72 at the forward end are joined to a forward wall 90 that inclines downwardly and rearwardly from a leading edge of the operator platform cart. The front wall 90 is fixed to side walls 88 and an operator support panel 92 of size to accommodate a standing operator is joined to the side walls 88 and front wall. The side walls taper upwardly from the rear of the front wall 90. The support panel 92 extends fore and aft a sufficient distance for providing an adequate area for the feet of a standing operator. The raised side walls and front wall also provide a tactile feel for the operator so the operator can sense the proper position on the platform.

The operator platform 70 has tapered or inclined front and rear walls which also will tend to help the platform to slide over uneven terrain, without plowing or pushing rocks, dirt, and other material ahead or behind the cart. The sloping front and rear walls are useful in soft ground.

A rear support frame 94 is secured to the platform 92, and also reinforced with suitable members to the side walls 88. The frames 94 has a rear flange portion 96 that is raised sufficiently above the ground to accommodate a caster wheel set 98 that is castered about a vertical pin 100. The caster wheel set will swivel as the rear of the operator platform swings when the loader is steered from side to side. The caster wheels provide support for the operator.

In FIG. 3, it can be seen in dotted lines that the operator platform 70 will move upwardly from a ground line shown at 101, in the range of 20° before the stop ends 84 of stop arms 80 will strike the trunion 62 to limit the relative movement upwardly of the operator platform to insure that there is a reasonable amount of clearance between the inclined support panel 92 and the rear of the loader 10.

As shown also in FIG. 3, the operator platform can pivot downwardly about 65-70° from a horizontal or ground line if the front end of the loader goes into a low spot. It is restricted in downward pivoting as illustrated in FIG. 3 by the end portion 84 engaging the inner surfaces. of panels 68 on the loader by contact with the frame.

The operator can thus stand on the support panel 92, and easily reach the control levers 56.

FIG. 1 shows schematically a pivoting plate 104, that will pivot so the lower edge moves inwardly, the plate will disengage the operator control levers 56 if the loader 10 is being moved in reverse and the panel 104 engages an object, or an operator. The limiting of the upward pivoting of the cart thus also reduces the likelihood of inadvertently stopping the motion of the loader by engaging this pivoting plate that acts as a reverse motion stop. A detailed showing and explanation of such pivoting plate loader motion control is included in U.S. patent application Ser. No. 10/071,559, filed Feb. 8, 2002 which is incorporated by reference.

Figure 5:
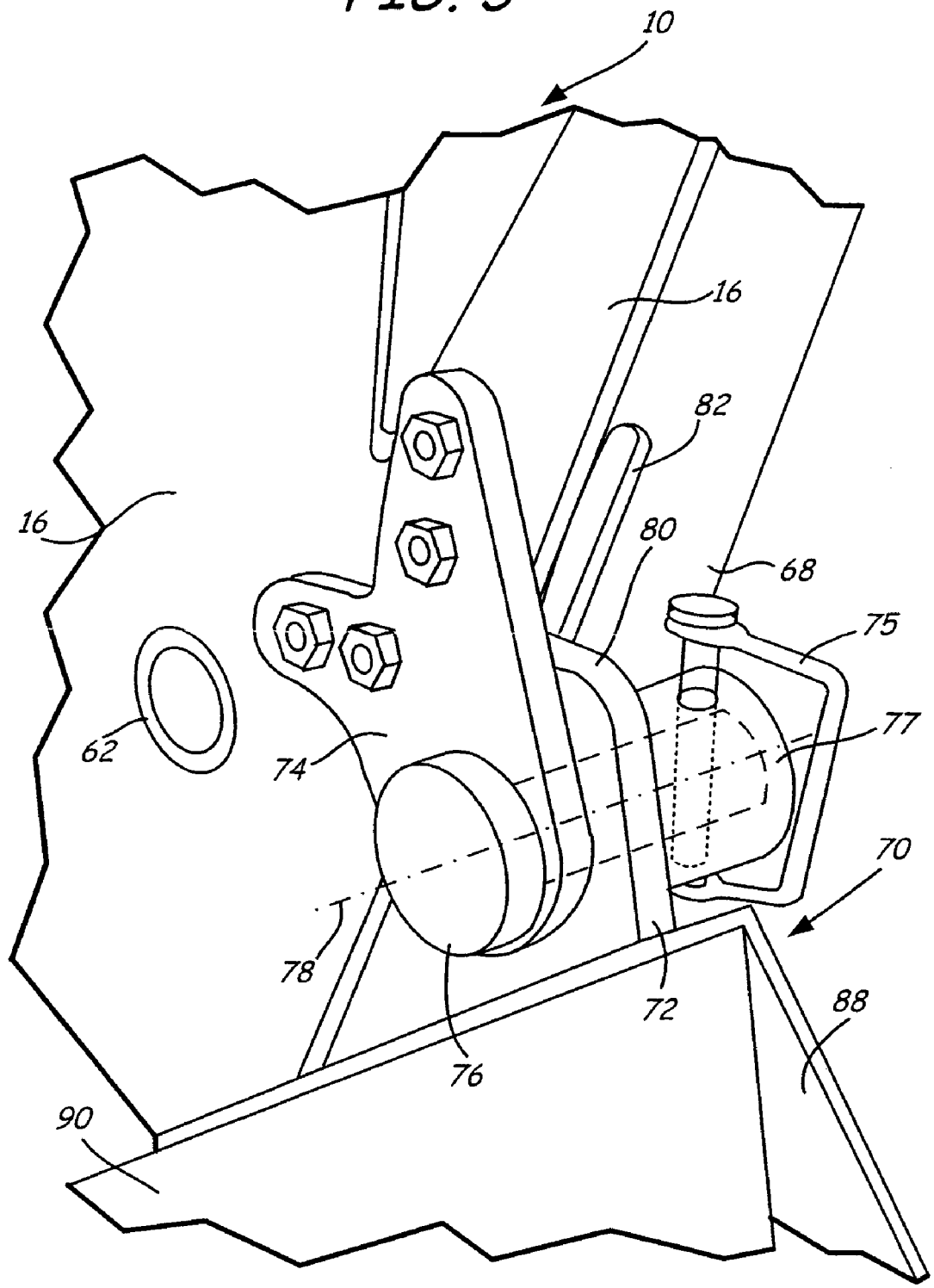
FIG. 5 is a rear perspective view of a mounting bracket for the operator platform cart.

It should be noted in FIG. 5 in particular, that the pivot pin 76 and pivot axis 78 are raised above the ground line 101 a substantial distance (about one foot) which reduces the amount of forward movement of the support panel 92 during the upward arc of the operator platform. In other words, the arc of movement of the operator about the pivot axis 78 is actually preferably rearwardly during the initial upward pivoting of the operator platform, to again reduce the movement of the operator forwardly to a position where an operator might inadvertently engage the pivoting panel 104 that is present on the loaders.

As shown, the side walls or panels 88, and the front wall 90 in this form of the invention provide a barrier to aid in keeping an operator's feet in the operator's station on the platform. The side and front rear, and center support gusset walls provide a "tactile" feel for the operator to remain centered and in proper position on the platform as previously mentioned.

Figure 6:
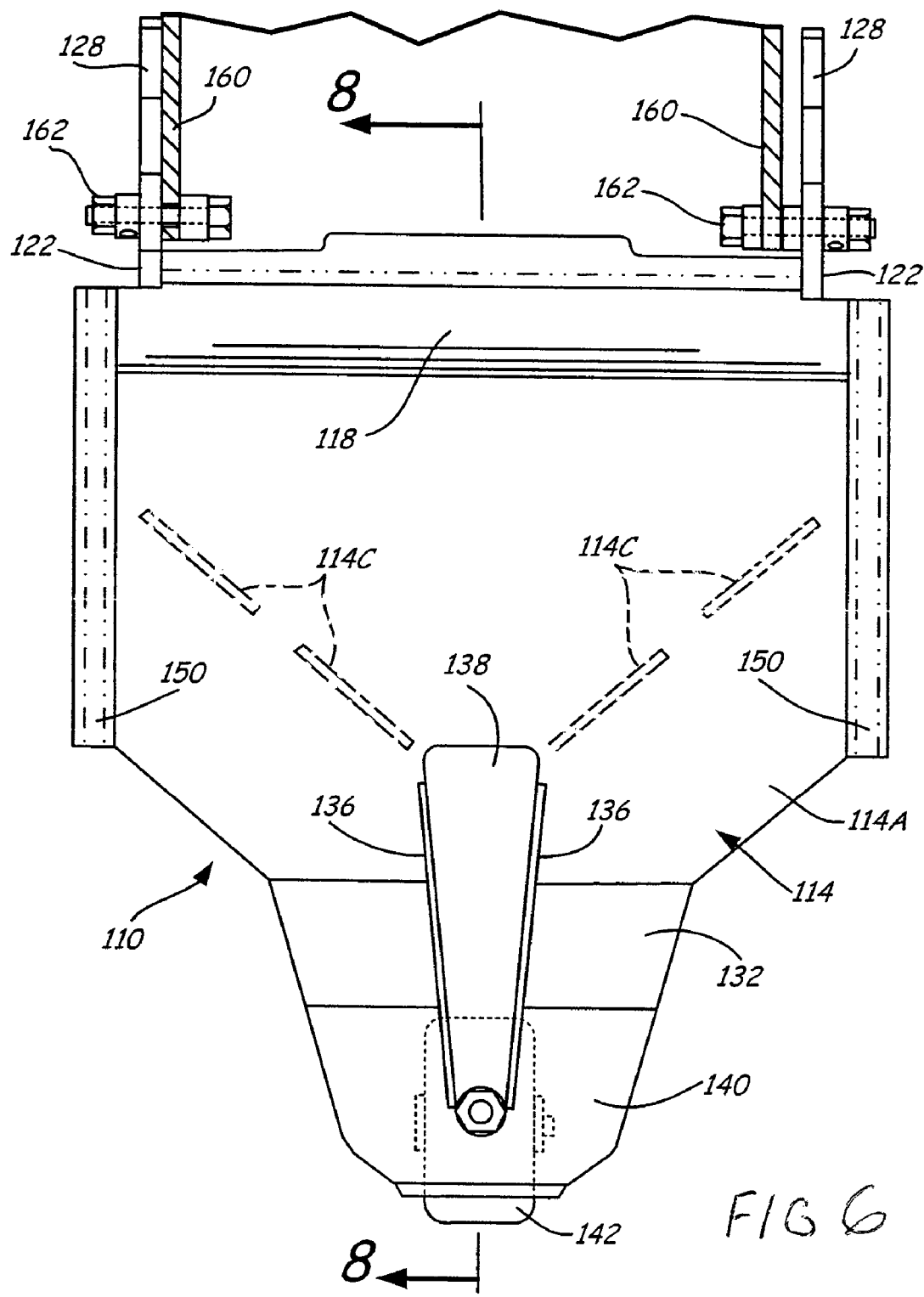
FIG. 6 is a top plan view of a slightly modified operator platform cart with parts broken away.

In FIGS. 6, 7, and 8, an operator platform 110 that is substantially similar to operator platform 70 is shown. The platform 110 will operate as described in relation to the platform 70 shown in FIGS. 1-5 and is attached to a vehicle loader in the same manner. In this form of the invention, the platform 110 has an operator support panel 114 constructed as shown in FIG. 8 with top and bottom panels 114A and 114B that are spaced apart and formed as a sandwich with gussets or webs 114C welded to the panels. The operator support panel 114 is of size to support a standing operator. The construction provides greater strength with lighter weight. The bottom surface 116 of lower panel 114B is smooth, with no ribs or protrusions. The smooth surface will not catch rocks or other debris and it slides over uneven terrain to make for a smoother ride. The operator platform 114 also will slide along soft surfaces, such as mud or sludge, rather than digging in. The bottom of the platform is also higher than the bottom of the loader frame to prevent rocks or other debris from inadvertently pivoting the platform upward.

The bottom panel 114B, as shown, has a forwardly inclined and upwardly sloped front wall section 118, that forms a forward wall of the operator's platform. The upper panel 114A has a flange 120 that joins this upwardly sloped wall 118. The flange and wall 118 are welded together. The cart has a pair of mounting arms 122 at the forward end, and the arms 122 include hubs 124 that are used for pivotally mounting the operator platform 110 onto a vehicle with suitable pins, as previously shown. The mounting arms 122 have hubs 124 thereon for receiving the mounting pivot pins. Forwardly extending stop arm portion 126 project forwardly from the pivot pin hubs 124. The forwardly extending stop arms will extend through the slots 82 shown in the previous form of the invention on the vehicle. Stop arms 126 have outer end stops 128 that will act in the same manner as the end portions 84 previously shown.

The mounting arms 122 are welded onto the inclined front wall or plate 118, and supported back to the webs 114C to provide for a sturdy construction. The webs 114C are frame members. The mounting arms 122 as can be seen in FIG. 8, do not project or extend below the plane of the bottom surface 116 of the lower plate 114B.

A rear wheel support frame 130 is formed to extend rearwardly for the operator platform 114, and has an upwardly inclined wall 132, braced with braces 134 on the underside of the wall 132 and the braces 134 have a horizontal portion 135 that extends rearwardly. The support frame 130 is also reinforced with two suitable top gussets 136. The gussets 136 are spaced apart and joined by a plate 138 that tapers down to platform top wall 114A. The rear wheel frame 130 rear portion 140 is substantially narrower than the platform 114. Rear portion has a horizontal portion and raised sufficiently above the ground to accommodate a caster wheel 142 that is mounted in a hub 144 which is supported in part by gussets 136. The caster wheel 142 includes a yoke 148 that will swivel on pin 146 as the rear of the operator platform cart 110 swings when the support vehicle or loader is steered from side to side. The caster wheel 142 provides rear support for the operator platform and the standing operator.

The operator platform support panel 114 has side walls 150 in this form of the invention that are tapered from the front to the rear, and are secured to the panel 114 along a junction line 152, but the side walls are not welded into position in relation to the sloping forward wall 118. There is a slip joint along a line 154 that will permit the front wall 118 to flex somewhat under loading without loading the side walls 150. The side walls 150 in this form also provide a "tactile" feel for the feet of the operator, along with the sloping front wall 118, and the sloping rear panel 132. It can be seen that the rear portions of the operator platform taper inwardly toward a center line in FIG. 6. In FIG. 6, frame members 160 of a loader are illustrated schematically, and a pin 162 is shown for pivotally mounting the support arms 122 relative to the frame members 160.

It can be seen that the distance between the pivot axis at the forward end of the operator platform, and the support line of the caster wheels is a substantial distance. The operator stands forwardly of the rear support point so that the amount of operator's weight that is carried by the caster wheel can be proportioned and reduced to prevent compaction and ground disturbance, but yet provide adequate support. In addition, the amplitude of vertical travel of the operator's position is proportionally less than that of the rear support wheel when traveling over rough terrain.

In FIGS. 9-12, a modified small self-propelled loader schematically indicated generally at 170 has a body or frame 172. The body or frame 172 supports a track assembly 174 on each side of the loader 170 for supporting the loader and propelling it over the ground in both forward and reverse directions through use of the drive hydraulic motors, one of which is indicated schematically at 176. The drive motor 176 on each side of the loader is connected to a suitable pump 179 through a valve or variable displacement pump 178 in a normal manner. The pump 179 is driven from an internal combustion engine on the frame 172.

The valves or variable displacement pumps for the drive motors 176 are controlled by operating handle 180 accessible from a rear of the loader, and operated by an operator that is at the rear of the machine. The internal combustion engine (not shown) is used for powering the unit.

The frame 172 has upright supports 182 at the rear portions thereof, and the upright supports pivotally mount a lift arm assembly 184, of conventional design. Pivots for the lift arm assembly are shown at 181, and the forward end of the lift arm assembly 184 can support a bucket or other accessory attachment.

The operator normally would walk behind the loader, but an operator platform 190 (See FIGS. 9 and 10 in particular) is supported at the rear of the loader, and provides a platform panel 192 on which an operator can stand and access the control levers 180.

The operator platform 190 has a frame 194 on which the platform panel 192 is supported. The platform panel 192 has side walls or panels 195 along the sides if desired, as well as a forward wall or panel 196. The side panels 195 and front panel 196 provide barriers to sliding a foot along the platform panel 192 and over an edge. The frame 194 extends forwardly from the front panel, and on opposite sides of the loader frame 172. The operator platform frame 194 has forward portions 201 of side members that are pivotally mounted about a generally horizontal axis on pins 198 to mounting blocks 199 on the frame 172, and in particular, to the side plates 200 of the loader or vehicle at the rear of the loader. The side plates 200 are part of the loader frame uprights 182.

The side plates 200 are positioned to the interior of the forwardly extending portions 202 of the platform frame 194 as shown in FIG. 10 and the forward portions 202 carry stop plates 204 on each side that are fixed to the frame 194. The stop plates 204 have forward stop edges 206 that will engage a pin 207 fixed on the frame 172 of the loader 170 if the operator platform 190 pivots so that the rear portion 208 of the operator platform 190 moves upwardly more then a selected amount. Specifically, a pivoting maximum range of about 10 to 25° as shown by the double arrow 210 is desirable, and is permitted.

The rear portion 208 of the operator platform 190 has an arched support 211 for a caster wheel 212. The caster wheel 212 is pivotally mounted about an upright pivot 214 in a suitable manner, and is made so that it will swivel easily as the loader is steered, and the operator platform 190, which is connected about the horizontal axis of pins 198, swings as the loader is steered.

The frame 194 is sturdy enough to support the operator, and the platform panel 192 can have anti-skid surfaces, of selected design, and can provided with adequate drainage, to prevent pooling of water. The stop limiting the upward pivoting reduces crowding the operator. The operator platform 190 will pivot downwardly, that is, the rear wheel moves downwardly a substantial amount as shown in dotted lines in FIG. 3.

A pivoting panel 216 on the rear of the loader is shown schematically, and when a force is applied to the panel in the direction of the arrow, a linkage will return the drive linkage to neutral or slightly beyond to disengage the rearward drive. The showing of such a panel that disengages the drive is shown in U.S. patent application Ser. No. 10/071,559 filed Feb. 8, 2002, as stated above.

The ability to pivot the rear of the platform about a horizontal axis permits the operator platform to move along the irregular contours of the ground, providing a smoother side.

Figure 11:
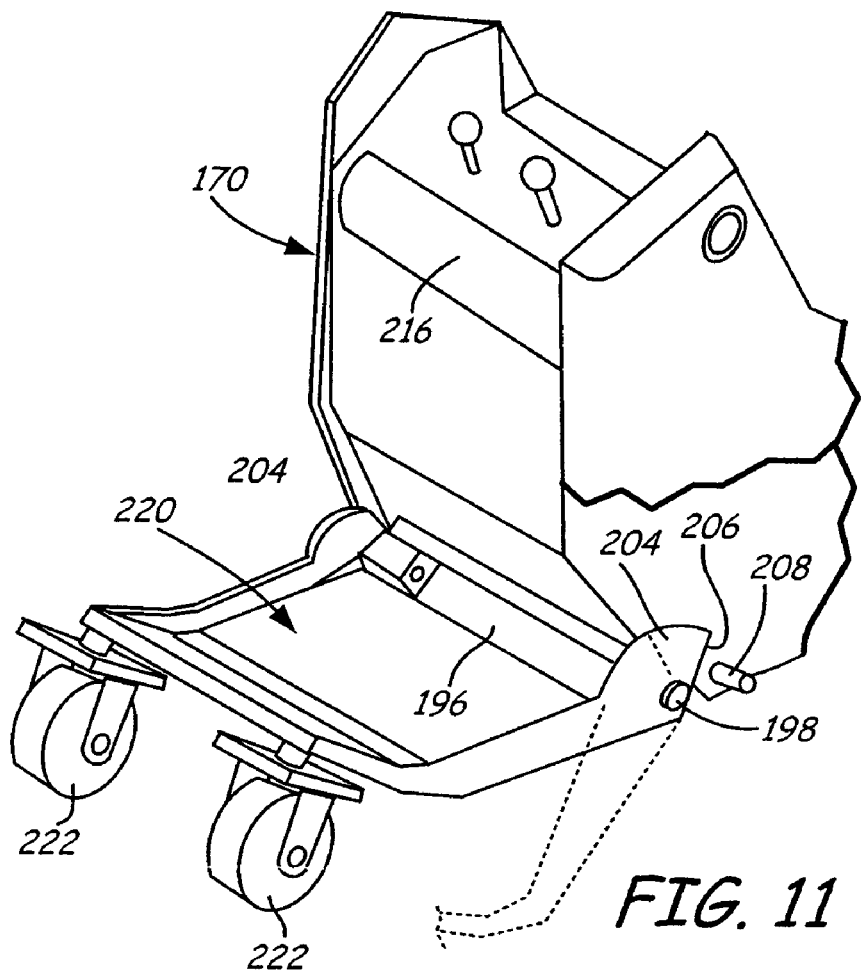
FIG. 11 is a perspective view of a modified platform wheel support for the rear of the operator platform.

A single caster wheel is preferred at the present time, and is shown in FIG. 1-7. However, a double caster wheel system can be used as generally shown in FIG. 11, and in this case the operator platform 220 has a pair of caster wheels 202, one at each of the opposite rear end corners. A support flange frame 224 is inclined upwardly from the generally horizontal operator support panel 226 on which the operator would stand. The same type of pivot pin 198 can be utilized with this carrier as shown in FIGS. 9 and 10, and the support of the two caster wheels will permit the unit to move as previously explained, as well as being stopped in upward direction. The two caster wheels distribute the weight between them.

Figure 12:
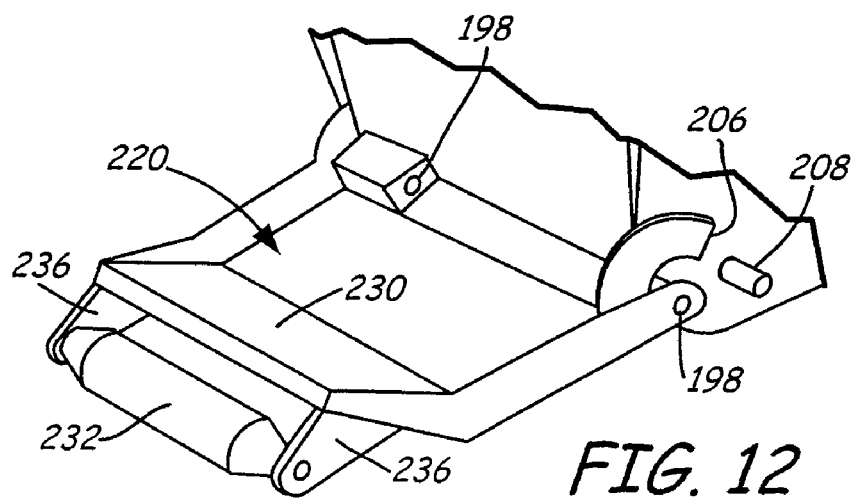
FIG. 12 is a top perspective view of a further alternate support for a rear of an operator platform cart.

FIG. 12 is a view similar to FIG. 11 that shows a modified operator platform 230, which is pivotally mounted in the same manner as shown in FIG. 9, but instead of one or more caster wheels, the operator platform 230 has a generally rounded end (spherical end) roller 232 rotatably mounted on arms 236 depending from a flange frame 234. The roller 232 will skid sideways easily during turning and can be used in place of casters. The roller 232 also can be a complete sphere. A skid plate that is tapered on its sides so that it will skid across the ground laterally of the loader, when the loader is steered, and will also skid in fore and aft directions, can be used as well.

The operator's platform or sulky of each form shown is easily detached by removing the pins 76 or 198, and thus the loader can be used as a standard walk behind machine. The operator support panel supporting a portion of the operator's weight improves the machine stability when attachments are at their maximum roll out with the lift arms fully lowered or near the bottom stops. In other words, the operator's weight tends to aid in counterbalancing the loader. Positioning the wheels on the operator's platform at the rear makes them less likely to catch or hang up when travelling over uneven terrain.

The ability of the operator platform or sulky to rotate in downward direction with respect to the machine frame prevents the operator from being lifted significantly if the rear of the loader or machine tilts up. Caster wheels or tapered rollers mounted on the operator platform cart frame minimizes the ground pressure and disturbance. Locating the supporting or wheels behind the operator support panel, means that under normal operating conditions only a fraction of the operator's weight must be supported by the rear support attached to the platform frame, in proportion to the locations of the operator's center of weight between the pivot point on the loader and the rear support wheel.

Since the operator is located between the pivot point of the frame and the support at the rear, the operator has less amplitude, velocity and acceleration in vertical direction than if a platform is rigidly attached to the loader frame or if the wheel is directly under or in front of the operator position. The movement of the operator platform rear wheel or wheels travelling over uneven terrain results in less movement of the operator, to result in a smoother ride.

Positioning of the support wheels, substantially behind the standing location, means the operator is less likely to move a foot over a rear edge of the platform. The rear mounted wheel or support structure is most likely to be the first point of contact for a solid object if the loader is travelling in reverse.

The operator platform is hinged at the rear of the vehicle frame, and because the rear of the platform itself is supported by a wheel, roller or skid, clearance is maintained between the front edge of the operator platform and the rear of the loader frame.

The geometry thus makes for a reliable, easily used ride on operator platform, attachable to a loader.

The operator platform hinge point is at the rear of the loader frame, and the rear support wheel of the operator platform is significantly behind the pivot. The gap between the rear edges of the operator platform and the ground surface does not significantly reduce when the front of the loader or machine frame is raised, or the rear of the loader frame drops or lowers. The spacing remains substantially the same along the rear edges of the operator platform and the ground.

As can be seen in FIG. 7 perhaps best, and also in FIG. 3, the support arms 80 or 122 can be used as handles to move the operator platform around much like a wheelbarrow when the operator platform is removed from the vehicle. The single rear caster wheel acts as a support wheel at the leading end as the platform is being pushed like a wheelbarrow when detached from the vehicle. The operator platform can also be pulled, but the spacing of the arm member 80 and 122, and the shape of the outer end portions 84 and 128 is such that if they can be grasped and used as handles for maneuvering the platform when it is disengaged from the vehicle.

Moving the operator platform for storage, or even for use for transporting objects, is a simple operation.

It is apparent that the horizontal pivot axis can be used alone, or if desired, the operator platform can be mounted about a generally vertical pivot axis in addition to the horizontal axis. Movement about the vertical axis generally would be restricted, but in some instances, could be used.

As shown in FIG. 8, the platform webs between panels 114A and 114B is configured so that as the bending moment on the platform increases, the section modulus is designed to increase proportionally. When the platform is against the upper rotation stops, bending moment along the platform increases as one gets closer to the horizontal hinge point, that is, adjacent to the machine pivot points. Thus, the gusseting of the platform is of greater lateral width between the gussets as it approaches the stop members, which also form handles, than it is back at the rear support or caster wheel.

Although the present invention has been described with reference to preferred embodiments, workers skilled in the art will recognize that changes may be made in form and detail without departing from the spirit and scope of the invention.

What is claimed is:

1. A self-propelled loader comprising:

a loader frame supported for movement over a supporting surface, the loader frame having front and rear ends and opposite sides;

a lift arm assembly mounted on the loader frame on pivots spaced upwardly from the supporting surface for supporting a bucket or other accessory at a front end of the lift arm assembly for movement relative to the loader frame;

operator controls located adjacent the rear end of the loader frame, the controls being spaced above the supporting surface such that the operator controls are accessible by the operator standing adjacent the rear end of the loader frame; and a ride-on operator platform connected to the rear end of the loader frame adjacent a lower side of the loader frame, the platform normally being generally horizontal for supporting a standing operator in a position to operate the operator controls, and the platform including a platform frame and a surface engaging support, and the platform frame being connected to the loader frame for pivotal movement relative thereto about a generally horizontal axis extending in the direction from side to side and adjacent the rear end of the loader frame, the platform being pivotable relative to a normal position in which the platform is located when the loader frame and the platform are on a generally horizontal surface, and the platform frame having at least one stop arm extending forwardly and away from the generally horizontal axis, a stop member fixed relative to the loader frame in a position such that upwardly pivotal movement of the platform about the axis is limited by engagement of the the at least one stop arm and stop member to an uppermost position, the uppermost position being such that the platform is at an angle of not greater than twenty five degrees above the normal position.

2. A loader as set forth in claim 1 wherein the loader frame includes, adjacent the rear end of the loader frame, first and second openings spaced apart in the direction between the sides, and the members fixed relative to the loader frame including first and second upper stops, and wherein at least one arm comprises first and second arms fixed to the platform frame each extend forwardly from the platform frame and each being connected to the loader frame for pivotal movement relative thereto about the generally horizontal axis, the first and second arms respectively extending through the first and second openings and respectively engaging the first and second upper stops to prevent upward pivotal movement of the platform beyond the uppermost position.

3. A loader as set forth in claim 1 wherein the loader frame includes, adjacent the rear end of the loader frame, first and second openings spaced apart in the direction between the sides of the loader frame, wherein the lift arm assembly includes first and second extendable and retractable assemblies respectively mounted on the loader frame by first and second trunions comprising the members fixed relative to the loader frame, and wherein the platform includes first and second arms laterally spaced apart from each other and rigidly affixed to the platform frame and comprising the at least one stop arm, the first and second arms each extending forwardly from the platform frame and each being connected to the loader frame for pivotal movement relative thereto about the generally horizontal axis, the first and second arms respectively extending through the first and second openings and respectively engaging the first and second trunions to prevent upwardly pivotal movement of the platform beyond the uppermost position.

4. A loader as set forth in claim 3 wherein the extendable and retractable assemblies are hydraulic assemblies.

5. A loader as set forth in claim 1 wherein the uppermost position is such that the platform is at an angle of not greater than approximately twenty degrees above the normal position.

6. A loader as set forth in claim 1 wherein the platform includes a generally horizontal platform panel for supporting a standing operator, the platform panel being supported by the platform frame, the platform frame having at least two portions spaced apart from each other and rigidly affixed to the platform panel at separate laterally spaced apart locations, the at least two portions each extending forwardly from the platform and each being pivotally connected to the loader frame for pivotal movement about the generally horizontal axis, the platform panel being positioned between the at least two portions and the surface engaging support being located at a rear of the platform frame.

7. A loader as set forth in claim 6 wherein said operator platform panel has upwardly projecting side and front walls that extend about the platform panel along edges thereof.

8. A loader as set forth in claim 6 wherein the surface engaging support comprises a caster wheel at the rear of the operator platform.

9. A loader as set forth in claim 6 wherein the generally horizontal axis is positioned above a supporting surface sufficiently so that as a rear portion of the operator platform moves in an arc upwardly about the generally horizontal axis the rear portion does not move substantially closer to the generally horizontal axis prior to reaching a position where the at least one stop arm the platform engages the stop member fixed relative to the loader frame.

10. A loader as set forth in claim 6 wherein the loader has a pivoting panel at a rear portion thereof spaced above the generally horizontal axis, said pivoting panel being moveable to disengage drive controls when the pivoting panel is moved in a forward direction, and said generally horizontal axis being spaced above a supporting surface for the operator platform a sufficient distance so that an arc described by a point on the platform panel initially moves away from the generally horizontal axis rearwardly as a rear portion of the operator platform pivots upwardly for a selected amount of upward pivoting.

11. A loader as set forth in claim 6, wherein said platform frame supports a panel having an upper surface that is of size to support a standing operator, and the panel having a lower surface that is smooth from side to side and front to back.

12. A self-propelled loader comprising:

a loader frame supported for movement over the ground, the loader frame having front and rear ends and opposite sides;

a lift arm assembly mounted on the loader frame for supporting a bucket or other accessory for movement relative to the loader frame;

operator controls located adjacent the rear end of the loader frame, the controls being mounted on a control panel extending between the opposite sides and spaced upwardly from the ground such that the operator controls are accessible by an operator standing upright adjacent the rear end of the loader frame; and a ride-on operator platform connected to the loader frame adjacent the rear end thereof, the platform normally being generally horizontal for supporting a standing operator, and the platform including a platform frame and a surface engaging support, and the platform having connectors pivotally connected to the loader frame for pivotal movement relative thereto about a generally horizontal pivot axis extending in a direction from side to side and adjacent the rear end of the loader frame, the platform being pivotable relative to a normal position in which the platform is located when the loader frame and the platform are on a generally horizontal surface, and the platform having at least one stop arm extending away from the connectors and the generally horizontal axis, the at least one stop arm engaging a lower stop fixed on the loader frame which is spaced from and independent of the connectors such that downward pivotal movement of the platform about the axis is limited to a lowermost position, the lowermost position being such that the platform is at an angle of not greater than approximately seventy degrees below the normal position.

13. A loader as set forth in claim 12 wherein the loader frame includes, adjacent the rear end of the loader frame, first and second openings spaced apart in the direction from side to side, and the lower stop on loader frame including first and second lower stops, and wherein the at least one stop arm of the platform comprises first and second stop arms laterally spaced apart from each other and rigidly affixed to the platform frame, the arms each extending forwardly from the platform frame, the first and second arms respectively having portions extending through the first and second openings and respectively engaging the first and second lower stops to prevent downward pivotal movement of the platform beyond the lowermost position.

14. A loader as set forth in claim 12 wherein the loader frame includes, adjacent the rear end of the loader frame, one or more generally vertical plates having inner and outer surfaces and having therein first and second slots spaced apart in the direction from side to side, and wherein the at least one stop arm of the platform includes first and second arms laterally spaced apart from each other and rigidly affixed to the platform frame, the arms each extending forwardly from the platform frame and the arms each being connected with the connectors to the loader frame for pivotal movement relative thereto about the generally horizontal axis, the first and second arms respectively having stop arm portion that extend away from the connectors and through the first and second slots and respectively engage the inner surfaces of the one or more plates to prevent downward pivotal movement of the platform beyond the lowermost position.

15. A loader as set forth in claim 12 wherein the platform includes a generally horizontal platform panel for supporting a standing operator, the platform panel being supported by the platform frame, the platform frame having at least two portions spaced apart from each other and rigidly affixed to the platform panel at separate laterally spaced apart locations, the at least two portions each extending forwardly from the platform and each being pivotally connected to the loader frame for pivotal movement about the generally horizontal axis, the platform panel being positioned between the at least two portions and the surface engaging support being located at a rear of the platform frame.

16. A loader as set forth in claim 15 wherein said operator platform panel has upwardly projecting side and front walls that extend above the platform panel along edges thereof.

17. A loader as set forth in claim 15 wherein the surface engaging support comprises a caster wheel at the rear of the operator platform.

18. A loader as set forth in claim 15 wherein the pivot axis is positioned above a supporting surface sufficiently so that as the rear portion of the operator platform moves in an arc upwardly about the pivot axis it does not move substantially closer to the pivot axis prior to reaching a position wherein portions of the first and second arms forming upward stop members for the operator platform engage first and second upward stop members on the loader frame.

19. A loader as set forth in claim 15 wherein the loader has a pivoting panel at a rear portion thereof spaced above the generally horizontal axis, said pivoting panel being moveable to disengage drive controls when the pivoting panel is moved in a forward direction, and said generally horizontal axis being spaced above a supporting surface for the operator platform a sufficient distance so that an arc described by a point on the platform panel initially moves away from the generally horizontal axis rearwardly as a rear portion of the operator platform pivots upwardly for a selected amount of upwardly pivoting.

20. A loader as set forth in claim 15, wherein said platform frame supports a panel having an upper surface that is of size to support a standing operator, and the panel having a lower surface that is smooth from side to side and front to back.

21. A self-propelled loader comprising:
a loader frame supported for movement over the ground, the loader frame having front and rear ends and opposite sides, the loader frame including, adjacent the rear end of the loader frame, first and second openings spaced apart in the direction between the sides, and the loader frame including first and second upper stops and first and second lower stops;
a lift arm assembly mounted on the loader frame for supporting a bucket or other accessory for movement relative to the loader frame;
operator controls located adjacent the rear end of the loader frame, the controls being accessible by an operator adjacent the rear end of the loader frame; and
a ride-on operator platform connected to the loader frame adjacent the rear end thereof, the platform normally being generally horizontal for supporting a standing operator, and the platform including a platform frame, a surface engaging support, and first and second arms laterally spaced apart from each other and rigidly affixed to the platform frame, the arms each extending forwardly from the platform frame and each being connected to the loader frame for pivotal movement relative thereto about a generally horizontal axis extending in the direction from side to side and adjacent the rear end of the loader frame, such that the platform is pivotable relative to the loader frame about an axis between uppermost and lowermost positions, the first and second arms respectively extending through the first and second openings and respectively engaging the first and second upper stops to prevent upward pivotal movement of the platform beyond the uppermost position, and the first and second arms respectively engaging the first and second lower stops to prevent downward pivotal movement of the platform beyond the lowermost position.

22. A loader as set forth in claim 21 wherein the loader frame includes, adjacent the rear end of the loader frame, one or more generally vertical plates having inner and outer surfaces, wherein the first and second openings are first and second slots in the one or more plates, and wherein the first and second arms respectively extend though the first and second slots and engage the inner surfaces of the one or more plates to prevent downwardly pivotal movement of the platform beyond the lowermost position.

23. A loader as set forth in claim 21 wherein the lift arm assembly includes first and second extendable and retractable assemblies respectively mounted on the loader frame by first and second trunions, and wherein the first and second arms respectively engage the first and second trunions to prevent upward pivotal movement of the platform beyond the uppermost position.

24. A loader as set forth in claim 23 wherein the extendable and retractable assemblies are hydraulic assemblies.

25. A loader frame as set forth in claim 21 wherein the platform includes a generally horizontal platform panel for supporting a standing operator, the platform panel being supported by the platform frame, the platform frame having at least two portions spaced apart from each other and rigidly affixed to the platform panel at separate laterally spaced apart locations, the at least two portions each extending forwardly from the platform and each being pivotally connected to the loader frame for pivotal movement about the generally horizontal axis, the platform panel being positioned between the at least two portions and the surface engaging support being located at a rear of the platform frame.

26. A loader as set forth in claim 25 wherein said operator platform panel has upwardly projecting side and front walls that extend above the platform panel along edges thereof.

27. A loader as set forth in claim 25 wherein the surface engaging support comprises a caster wheel at the rear of the operator platform.

28. A loader as set forth in claim 25 wherein the generally horizontal axis is positioned above a supporting surface sufficiently so that as the rear portion of the operator platform moves in an arc upwardly about the generally horizontal axis it does not move substantially closer to the generally horizontal axis prior to reaching a position where the arms of the operator platform engage the upper stops on the loader frame.

29. A loader as set forth in claim 25 wherein the loader has a pivoting panel at a rear portion thereof spaced above the generally horizontal axis, said pivoting panel being moveable to disengage drive controls when the pivoting panel is moved in a forward direction, and said axis being spaced above a supporting surface for the operator platform a sufficient distance so that an arc described by a point on the platform panel initially moves away from the axis rearwardly as a rear portion of the operator platform pivots upwardly for a selected amount of upwardly pivoting.

30. A loader as set forth in claim 25, wherein said platform frame supports a panel having an upper surface that is of size to support a standing operator, the platform panel comprising an upper panel sheet and a lower panel sheet spaced apart in a vertical direction, and a plurality of webs between the panel sheets and fixed thereto and the lower panel sheet having a lower surface that is smooth from side to side and front to back.

* * * * *

UNITED STATES PATENT AND TRADEMARK OFFICE
CERTIFICATE OF CORRECTION

| | | |
|---|---|---|
| PATENT NO. | : 7,611,155 B2 | Page 1 of 1 |
| APPLICATION NO. | : 11/743878 | |
| DATED | : November 3, 2009 | |
| INVENTOR(S) | : Mark F. Bares | |

It is certified that error appears in the above-identified patent and that said Letters Patent is hereby corrected as shown below:

In the Claims

Column 9:

Claim 1, Line 34: after "engagement of" delete "the".

Column 9:

Claim 2, Line 44: after "wherein" insert --the--.

Claim 2, Line 45: after "one" insert --stop--.

Signed and Sealed this
Third Day of June, 2014

Michelle K. Lee
*Deputy Director of the United States Patent and Trademark Office*